United States Patent
Yanagihara et al.

(12)

(10) Patent No.: US 6,233,393 B1
(45) Date of Patent: May 15, 2001

(54) APPARATUS FOR TRANSMITTING DATA IN ISOCHRONOUS AND ASYNCHRONOUS MANNERS, AN APPARATUS FOR RECEIVING THE SAME, AND A SYSTEM AND METHOD FOR SUCH TRANSMITTING AND RECEIVING OF SUCH DATA

(75) Inventors: Naofumi Yanagihara, Tokyo; Mari Horiguchi, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/932,129

(22) Filed: Sep. 18, 1997

(30) Foreign Application Priority Data

Sep. 27, 1996 (JP) .................................................. 8-256838

(51) Int. Cl.[7] .................................................. H04N 5/781
(52) U.S. Cl. ........................... 386/125; 348/552; 725/141
(58) Field of Search .................................. 386/125–126; 348/423, 7–9, 12–13, 552; 370/395; 725/141, 140; H04N 5/781

(56) References Cited

U.S. PATENT DOCUMENTS

| | | | |
|---|---|---|---|
| 5,608,608 | * | 3/1997 | Flint et al. ............................ 361/686 |
| 5,745,643 | * | 4/1998 | Mishina ................................ 386/106 |
| 5,790,743 | * | 8/1998 | Sugiyama et al. ..................... 386/52 |
| 5,802,017 | * | 9/1998 | Sato et al. ............................ 725/140 |
| 5,808,660 | * | 9/1998 | Sekine et al. ............................ 348/8 |
| 5,838,876 | * | 11/1998 | Iwamura ................................ 386/125 |
| 5,847,771 | * | 12/1998 | Cloutier et al. ....................... 348/564 |
| 5,933,430 | * | 8/1999 | Osakabe et al. ...................... 370/395 |

OTHER PUBLICATIONS

IEEE, "P1394 Standard For A High performance Serial Bus", 1–2, 23, 27, 32, 143 and 331–337, Jul. 1995.*

* cited by examiner

Primary Examiner—Wendy R. Garber
Assistant Examiner—Vincent F. Boccio
(74) Attorney, Agent, or Firm—Frommer Lawrence & Haug, LLP.; William S. Frommer; Dennis M. Smid

(57) ABSTRACT

In a system having a digital video disc (DVD) player and a number of presentation devices (such as a television receiver, video cassette recorder/reproducer, and so forth), the DVD player may transmit presentation data and a portion of control or navigation data obtained from a digital video disc (DVD) to a desired one of the presentation devices in an isochronous communication manner so as to enable the respective presentation device to process or decode the presentation data in accordance with the transmitted portion of the navigation data without substantial time delays (or in real time). The remaining portion of the navigation data (which is not utilized in such real time processing) may be transmitted from the DVD player to the respective presentation device in an asynchronous communication manner. Such arrangement of isochronous and asynchronous communication enables processing to be performed by the respective presentation device so as to reduce the amount of processing which may otherwise have to be performed by the DVD player.

13 Claims, 16 Drawing Sheets

FIG. 6A

| CTS | CT/RC | HA | OPC | OPR | OPR | OPR |
|---|---|---|---|---|---|---|
| "0"h | REQUEST | DESTINATION | COMMAND | PARAMETER 1 | PARAMETER 2 | PARAMETER 3 |

FIG. 6B

| "0"h | RESPONSE | ADDRESSER | PROCESSED COMMAND | PARAMETER 1 | PARAMETER 2 | PARAMETER 3 |
|---|---|---|---|---|---|---|

FIG. 10

| stream_id | STREAM CODING |
|---|---|
| 110x0···b | MPEG AUDIO STREAM··· = DECODING AUDIO STREAM NUMBER |
| 11100000b | VIDEO STREAM |
| 10111101b | private_stream_1 |
| 10111111b | private_stream_2 |
| OTHERS | NO USE |

FIG. 11 sub_stream_id FOR private_stream_1

| sub_stream_id | STREAM CODING |
|---|---|
| 001·····b | Sub_picture STREAM·····=DECODING Sub_picture STREAM NUMBER |
| 01001000b | RESERVED |
| 011·····b | RESERVED (FOR EXTENDED Sub_picture) |
| 10000·····b | DOLBY AC-3 AUDIO STREAM·····=DECODING AUDIO STREAM NUMBER |
| 10001·····b | DTS AUDIO STREAM (OPTION)·····=DECODING AUDIO STREAM NUMBER |
| 10010·····b | SDDS AUDIO STREAM (OPTION)·····=DECODING AUDIO STREAM NUMBER |
| 10100·····b | LINEAR PCM AUDIO STREAM·····=DECODING AUDIO STREAM NUMBER |
| 11111111b | PROVIDER DEFINED STREAM |
| OTHERS | RESERVED (FOR FUTURE PRESENTATION DATA) |

FIG. 12

| sub_stream_id | STREAM CODING for private_stream_2 |
|---|---|
| 00000000b | PCI STREAM |
| 00000001b | DSI STREAM |
| 11111111b | PROVIDER DEFINED STREAM |
| OTHERS | RESERVED (FOR FUTURE NAVIGATION DATA) |

APPARATUS FOR TRANSMITTING DATA IN ISOCHRONOUS AND ASYNCHRONOUS MANNERS, AN APPARATUS FOR RECEIVING THE SAME, AND A SYSTEM AND METHOD FOR SUCH TRANSMITTING AND RECEIVING OF SUCH DATA

BACKGROUND OF THE INVENTION

The present invention relates to data communication between a plurality of audio/video (AV) devices and, more particularly, to a system having a digital versatile (video) disc (DVD) device and another AV device wherein data is transmitted and/or received therebetween in accordance with two transmission techniques.

A digital versatile (video) disc (DVD) player may reproduce data recorded on a digital video disc (DVD). More specifically, the DVD player may regenerate or reproduce data from a DVD in a driver section, decode the reproduced data in a decoder section, and provide signals corresponding thereto for enabling a picture to be displayed. The data recorded on a DVD may have been compressed according to a predetermined standard, such as that of a Moving Picture Experts Group (MPEG) standard. Further, the MPEG data recorded on a DVD may be a program data stream which represents a set of programs having video information, audio information, and auxiliary data.

FIG. 14 illustrates a DVD player 1 and a DVD 101. As shown therein, the DVD 101 includes so-called navigation data and so-called presentation data, and the DVD player 1 includes a navigation manager 11 and a presentation engine 12. The presentation data may include video data, audio data, and sub-picture data which corresponds to such video and audio data, and the navigation data may include data pertaining to or utilized in the reproduction of the presentation data such as data which specifies the order of reproduction and/or behavior during the regeneration.

In the DVD player 1, the navigation data is read from the DVD 101 and supplied to the navigation manager 11. The navigation manager 11 generates a control signal in accordance with such received navigation data and supplies the same to the presentation engine 12. Additionally, the presentation data is read from the DVD 101 and supplied to the presentation engine 12. The presentation engine 12 regenerates or reproduces the received presentation data in accordance with the control signal from the navigation manager and outputs the same as a display signal.

In addition to the navigation data, the navigation manager 11 may also receive a command signal corresponding to a user operation from an external device (not shown), and may perform processing in accordance with such command signal. As an example, consider the situation wherein a user desires to change the language of reproduced speech from Japanese to English. In such situation, the user may appropriately operate a speech selection key (not shown), whereupon a command signal corresponding to the desired speech change is supplied to the navigation manager 11. In response thereto, the navigation manager 11 may read a stream number corresponding to a sub-ID of English speech from a table which indicates a relationship between stream number and sub-ID in the navigation data, and may output this information to the presentation engine 12. In response thereto, the presentation engine 12 changes the language from Japanese to English and outputs the speech in English.

FIG. 15 illustrates the navigation manager 11. As shown therein, the navigation manager 11 includes a general controller section 21, an entry searching section 22, a navigation controller section 23, and a user interface controller section 24. As also shown in FIG. 15, the navigation data includes general control data, entry search data, us interface control data, and navigation control data.

The general control data read from the disc 101 is supplied to the general controller section 21. Such general control data may include general information pertaining to a stream of data (such as, the type of broadcast system (NTSC, PAL), the type of compression mode, and so forth) and parental information. The general controller section 21 may set a decoder, or a parameter(s) pertaining thereto, in the presentation engine 12 in accordance with the received general control data. For example, the general controller section 21 may determine the compression of the speech data (such as one of MPEG-Audio, Dolby AC-3, and Liner PCM) to be regenerated or reproduced from the general control data.

The entry search data read from the disc 101 is supplied to the entry search section 22. Such entry search data may include so-called program chain information (PGCI) which may indicate a data regeneration sequence(s) and an address table which indicates the position(s) whereat the presentation data is recorded in the disc 101. The entry search section 22 may select the respective PGCI based on the parental information supplied from the general controller section 21 and an address corresponding to the presentation data.

The user interface control data read from the disc 101 is supplied to the user interface controller section 24. Such user interface control data may include data for prohibiting an operation or for directing an operation if permitted by a user depending on the regeneration position. As an example, the user interface controller section 24 may supply a signal corresponding to an operation to an appropriate circuit (not shown) if such operation is permitted by a user.

The navigation control data, which may be PGCI, is supplied to the navigation controller section 23. The navigation controller section 23 may extract information, such as that pertaining to the order and setting of the regeneration, from the received data and may supply such information to the presentation engine 12.

FIG. 16 illustrates the presentation engine 12. As shown therein, such presentation engine includes a demultiplexer (demux) section 31, an audio decoder 32, a video decoder 33, a sub-picture (SP) decoder 34, a highlight decoder 35, and a superimposition circuit 36.

The demux section 31 receives presentation data from the disc 101 and classifies or determines the type of such data as one of audio pack, video pack, and sub-picture pack in accordance with the stream ID written in the packet header of the presentation data. Based upon the type of data, the demux section 31 supplies output data to the appropriate one of the audio decoder 32, the video decoder 33, and the sub-picture decoder 34 so as to be decoded thereat. A decoded signal from the audio decoder 32 is supplied to a digital-to-analog (D/A) converter 41, whereupon such signal is converted into an analog speech or audio signal and outputted therefrom. Decoded signals from the video decoder 33 and the sub-picture decoder 34 may be supplied to the superimposition circuit 36.

The highlight decoder 35 may provide information pertaining to a position to be highlighted and a color to be used therewith in accordance with highlight information supplied from the navigation manager 11. Decoded highlighted picture information from the highlight decoder 35 may be supplied to the superimposition circuit 36.

The superimposition circuit 36 may receive information representative of a video picture from the video decoder 33, a sub-picture or caption picture from the sub-picture decoder 34, and a highlight picture from the highlight decoder 35, and may superimpose the received information. A superimposed picture signal from the superimposition circuit 36 may be supplied to a digital-to-analog (D/A) converter 42, whereupon such signal is converted into an analog picture signal and outputted therefrom.

Therefore, the navigation manager 11 processes the navigation data and the presentation engine 12 processes the presentation data so as to regenerate or reproduce data recorded on a DVD 101. Further, in processing the presentation data, the presentation engine 12 may utilize information (such as setting information) from the navigation manager 11.

The assignee of the present invention has provided a system in which data read from a DVD may be transmitted to a plurality of digital televisions through a digital interface and the data may be regenerated in each digital television. Such system is described in Japanese Patent Application No. Hei 8-238761 and the corresponding U.S. application Ser. No. 08/926,416 filed Sep. 9, 1997 which are hereby incorporated by reference. However, in this system, the presentation data may be processed in conjunction with navigation data on the transmission side, and thereafter the data is transmitted to the receiving side for decoding. As a result, since such processing is performed on the transmission side, the amount of processing performed on the transmission side is relatively large and, as such, may present a problem.

OBJECTS AND SUMMARY OF THE INVENTION

An object of the present invention is to provide a system having transmitting and receiving devices wherein processing corresponding to or involving navigation data may be performed at the receiving side so as to lessen the amount of processing which might otherwise be performed on the transmission side thereby overcoming the problem in the above-mentioned system.

More specifically, it is an object of the present invention to provide an audio/video system having a digital video disc (DVD) player and a presentation device wherein the DVD player produces video data, audio data, and control or navigation data and wherein the video data, the audio data, and a portion of the navigation data are transmitted in an isochronous manner from the DVD player to the presentation device and processed thereat.

Another object of the present invention is to provide an audio/video system as aforesaid wherein the DVD player has a first interface and the presentation device has a second interface and wherein the first and second interfaces conform to a 1394 IEEE standard.

Yet another object of the present invention is to provide a DVD player for use in an audio/video system having a number of presentation devices wherein the DVD player produces video data, audio data, and control or navigation data and transmits the video data, the audio data, and a portion of the navigation data in an isochronous manner to at least one of the presentation devices so as to be processed thereat.

A further object of the present invention is to provide a presentation device for use in an audio/video system having a digital video disc (DVD) player which produces video data, audio data, and control or navigation data wherein such video data, audio data, and a portion of such navigation data are transmitted in an isochronous manner from the DVD player to the presentation device and processed thereat.

In accordance with an aspect of the present invention, an audio/video system is provided which comprises (i) a digital versatile disc (DVD) apparatus having a device for producing audio data, video data, and navigation data; and a first interface for transmitting the audio data, the video data, and a portion of the navigation data in a first manner and for transmitting another portion of the navigation data in a second manner; and (ii) a presentation apparatus having a second interface for receiving the audio data, the video data, and a portion of the navigation data in the first manner from the DVD apparatus and for receiving another portion of the navigation data in the second manner from the DVD apparatus.

In accordance with another aspect of the present invention, a digital versatile disc (DVD) apparatus adaptable to be coupled to a number of presentation devices is provided. Such apparatus comprises a device for producing audio data, video data, and navigation data; and an interface for transmitting the audio data, the video data, and a portion of the navigation data in a first manner to one of the presentation devices and for transmitting another portion of the navigation data in a second manner to the respective one of the presentation devices.

In accordance with another aspect of the present invention, a presentation apparatus for receiving audio data, video data, and navigation data is provided. Such apparatus comprises an interface for receiving the audio data, the video data, and a portion of the navigation data in a first manner and for receiving another portion of the navigation data in a second manner; a first processing device for processing the audio data, the video data, and the portion of the navigation data received in the first manner; and a second processing device for processing the other portion of the navigation data received in the second manner.

Further, the present system may include a first device for transmitting encoded first data and second data having regeneration sequence information of the first data through a digital interface, and a plurality of second devices for receiving the first and second data transmitted through the digital interface and for decoding the first data by utilizing the second data.

Other objects, features and advantages according to the present invention will become apparent from the following detailed description of illustrated embodiments when read in connection with the accompanying drawings in which corresponding components are identified by the same reference numerals.

BRIEF DESCRIPTION OF THE DRAWINGS

FIGS. 6A and 6B are diagrams to which reference will be made in explaining a format of asynchronous communication;

FIG. 10 is a diagram to which reference will be made in explaining a relationship between stream ID values and pack types;

FIG. 11 is a diagram to which reference will be made in explaining a relationship between sub-stream ID values of presentation data and pack types;

FIG. 12 is a diagram to which reference will be made in explaining a relationship between sub-stream ID values of navigation data and pack types;

DETAILED DESCRIPTION OF THE PREFERRED EMBODIMENTS

Figure 1:
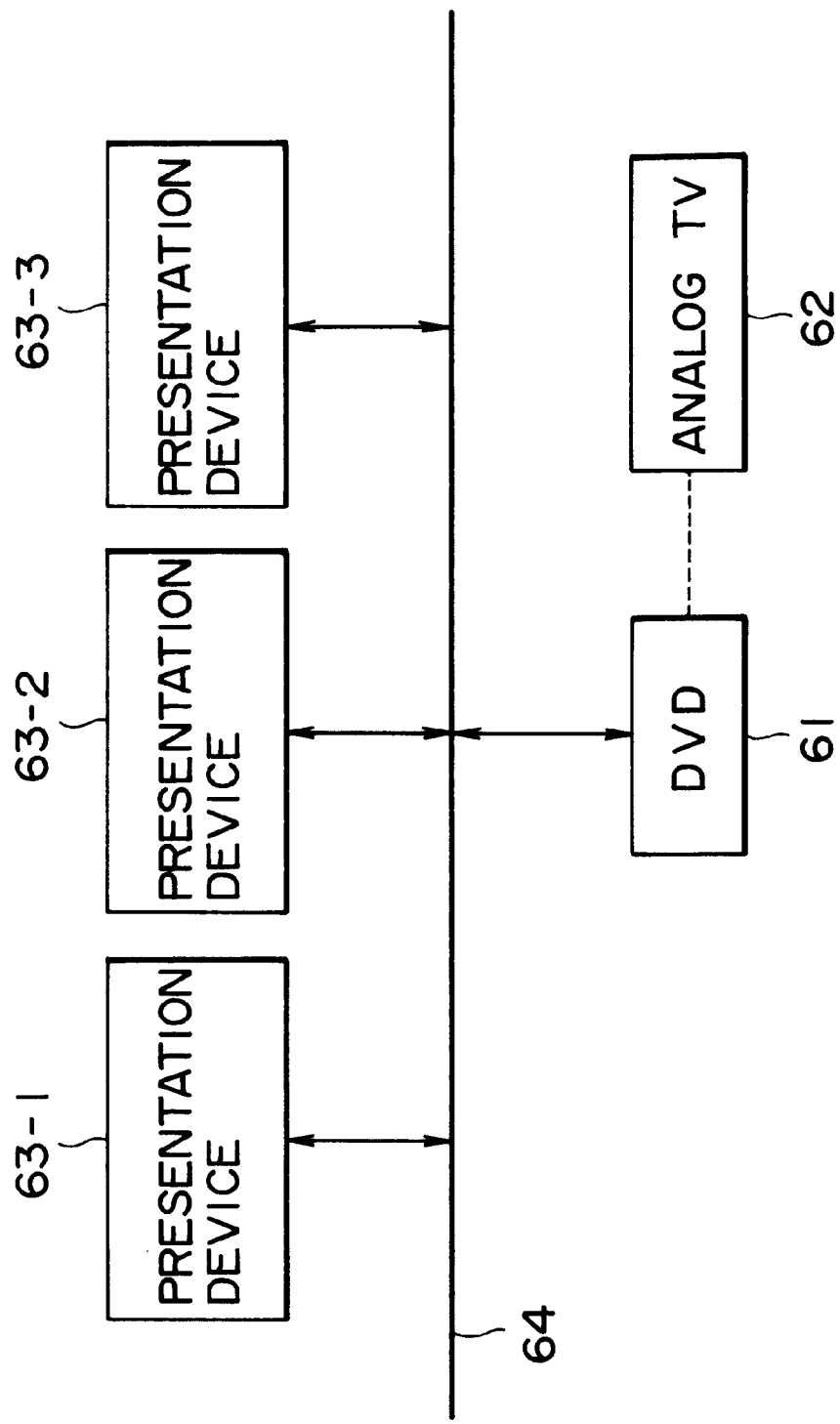
FIG. 1 is a diagram of an audio/video (AV) system incorporating the present invention.

FIG. 1 illustrates an AV system which incorporates the data processing, transmitting, and receiving system of the present invention. As shown therein, such AV system includes a DVD 61 and presentation devices 63-1 to 63-3 which are coupled therebetween by an AV bus 64.

In the AV system of FIG. 1, the DVD player 61 may reproduce or regenerate a DVD (disc) and supply encoded data signals to one or more of the plurality of presentation devices 63-1 to 63-3 by way of the AV bus 64. Further, the presentation devices 63-1 to 63-3 may supply data or information to the DVD player 61 by way of the AV bus 64. The AV bus 64 may be a standard bus, such as a 1394 IEEE (Institute of Electrical and Electronic Engineers) High Performance Serial Bus. In other words, one or more of the presentation devices 63-1 to 63-3, which may be a television receiver, a video cassette recorder/reproducer (VCR) or the like, may receive the encoded data from the DVD player 61 and may process the same and may supply data or information to the DVD player 61 such as in a manner as hereinafter described. Additionally, the DVD player 61 may reproduce or regenerate data from a DVD (disc) and supply an analog video signal to an analog television 62, whereupon a picture may be displayed thereat corresponding to such signal.

Figure 2:
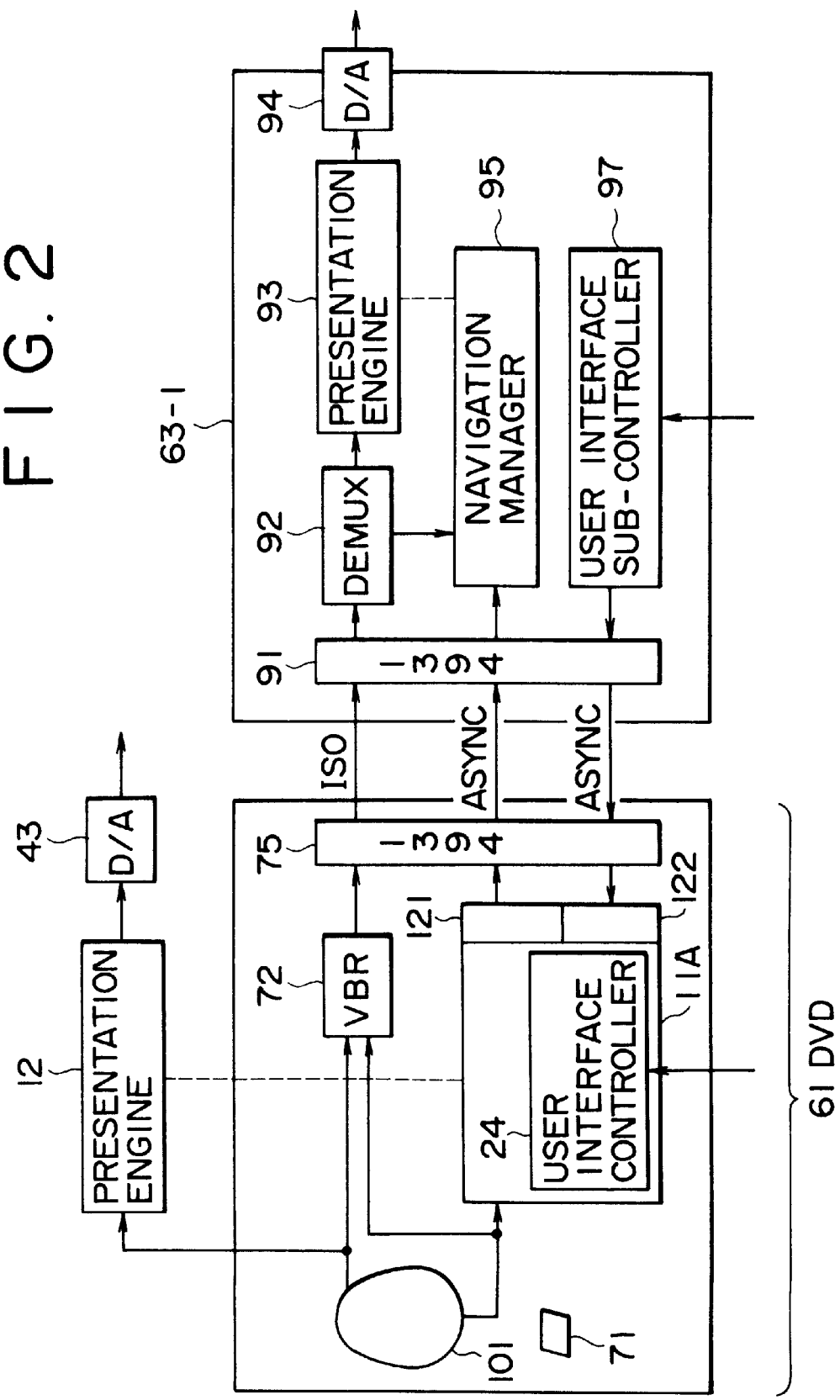
FIG. 2 is a diagram of a DVD player and a presentation device of the system of FIG. 1 in accordance with an embodiment of the present invention.

FIG. 2 illustrates the DVD player 61 and the presentation device 63-1 in more detail. Although not shown in FIG. 2, each of the presentation devices 63-2 and 63-3 may have a structure similar to that of the presentation device 63-1 and, as such, will not be further described herein.

As shown in FIG. 2, presentation data and navigation data recorded on a disc 101 may be reproduced or read therefrom by a disc drive 71 of the DVD player 61. The reproduced presentation data, which may include an audio pack, a video pack, or sub-picture pack, may be supplied to a presentation engine 12 and a variable rate (VBR) controller section 72. The reproduced navigation data, which may include a navigation pack, video manager information (VMGI), and video title set information (VTSI), may be supplied to a navigation manager 11A and the variable rate controller section 72.

Figure 16:
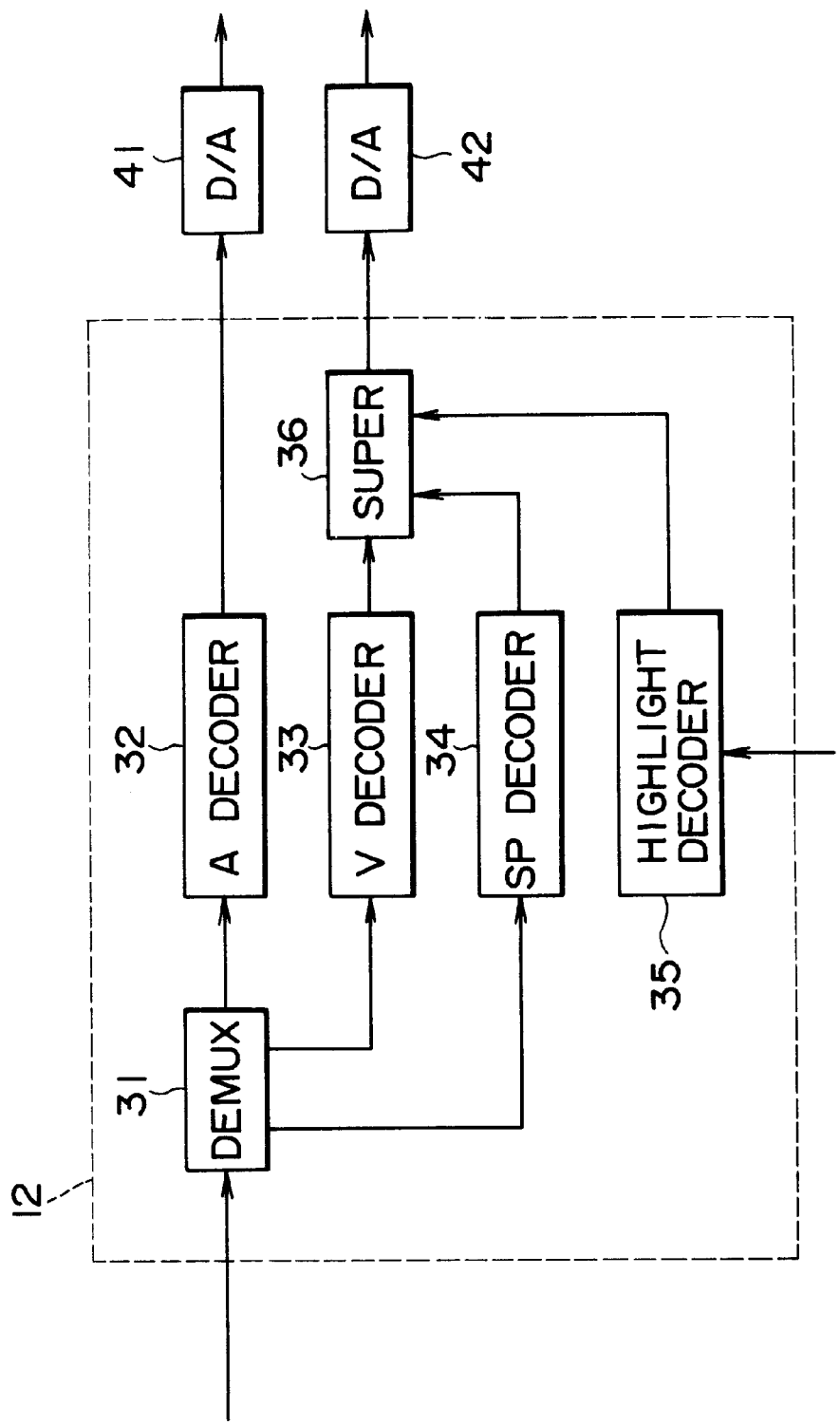
FIG. 16 is a diagram to which reference will be made in explaining a presentation engine 12 of the DVD player of FIG. 14.

The presentation engine 12 may have a similar structure to that shown in FIG. 16 and, as a result, a further detailed description thereof is omitted herein. A digital audio signal and a digital video signal from the presentation engine 12 may be supplied to a digital-to-analog (D/A) converter 43 so as to be respectively converted to an analog audio signal and an analog video signal which may be supplied to the analog television 62 (FIG. 1).

Figure 15:
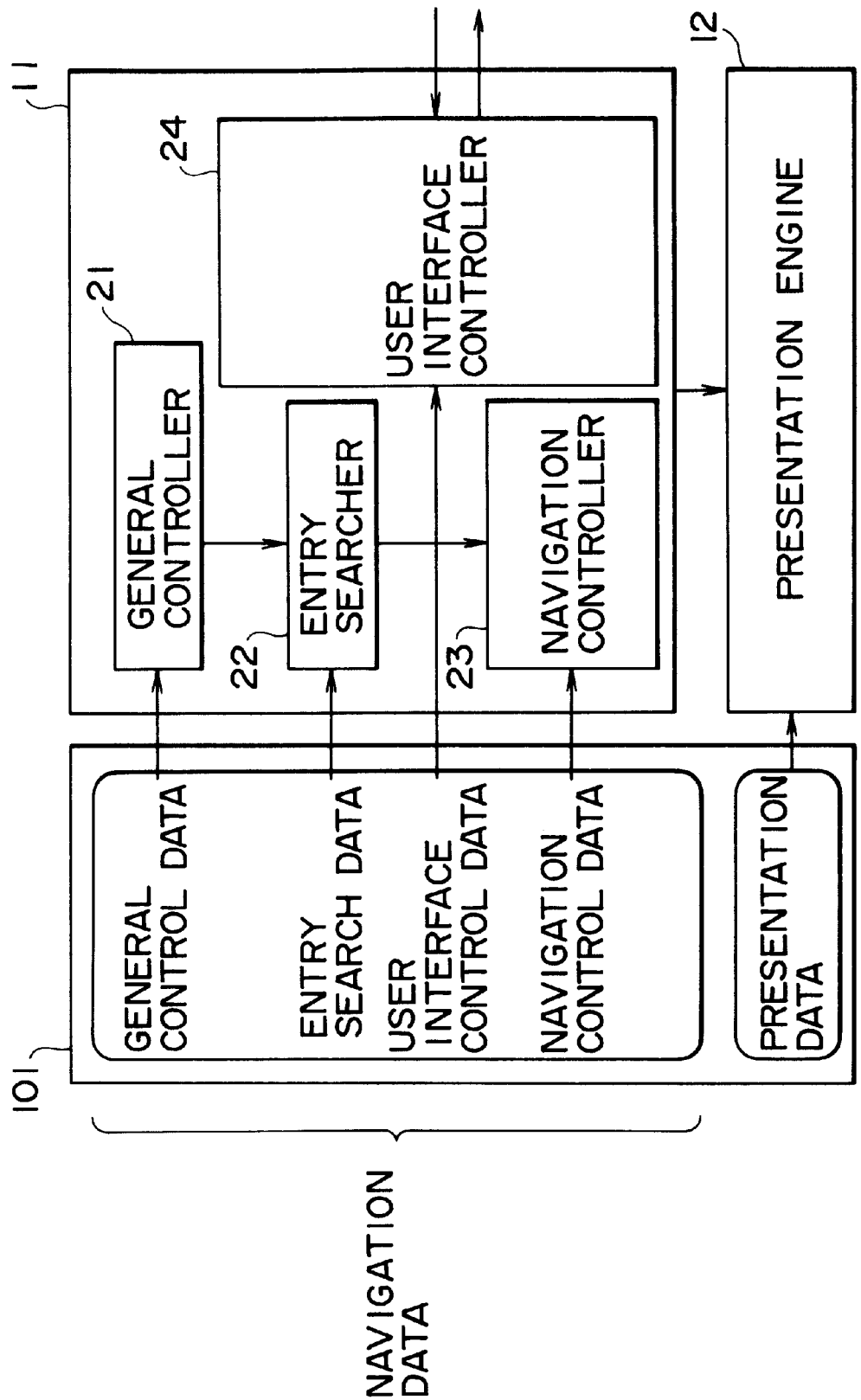
FIG. 15 is a diagram to which reference will be made in explaining a navigation manager of the DVD player of FIG. 14.

The navigation manager 11A may include a transmission section 121 and a receiver section 122. The transmission section 121 may generate or provide data (such as a system parameter stored in a prescribed register) which may be used in processing performed by a navigation manager 95 of the presentation device 63-1. The receiver section 122 may receive a command signal corresponding to a user operation from the presentation device 63-1 (which may have been generated in a user interface sub-controller section 97) and may convert such command signal so as to have a format which corresponds to the processing performed by the navigation manager 11A. In this operation, the navigation manager 11A may utilized a technique described in previously mentioned Japanese Patent Application No. Hei 8-238761 (corresponding to U.S. application Ser. No. 08/926,416). The navigation manager 11A may have elements similar to those of the navigation manager 11 shown in FIG. 15.

The variable rate controller section 72 may supply the received presentation data and navigation data to a transmitter receiver section 75. Such variable rate controller section may be configured as described in Japanese Patent Application No. Hei 8-238781 which corresponds to U.S. application Ser. No. 08/926,165 filed Sep. 9, 1997 which are hereby incorporated by reference.

The transmitter receiver section 75 is adapted to perform isochronous and/or asynchronous processing or communication in accordance with a predetermined standard such as an IEEE 1394 standard. The 1394 transmitter receiver section 75 may transmit the data received from the variable rate controller 72 to a transmitter receiver section 91 of the presentation device 63-1 in an isochronous manner according to an IEEE 1394 standard. As a result of such isochronous data transfer, the presentation device 63-1 may decode or process the received data without substantial time delays (as if in real time). The 1394 transmitter receiver section 75 may also transmit the system parameter from the transmitter section 121 of the navigation manager 11A to the transmitter receiver section 91 of the presentation device 63-1 in an asynchronous manner according to an IEEE 1394 standard. Additionally, the 1394 transmitter receiver section 75 may receive a signal in an asynchronous manner from the transmitter receiver section 91 which corresponds to a user operation and which may have been generated in the user interface sub-controller 97 of the presentation device 63-1 in response to a user input, and may supply such signal to the receiver section 122 of the navigation manager 11A.

Therefore, the 1394 transmitter receiver section 75 may perform isochronous and asynchronous communication. Additionally, the 1394 transmitter receiver section 75 may transmit data by way of isochronous communication and may transmit commands and answers by way of asynchronous communication. Details including packet structures pertaining to such isochronous and asynchronous communication will now be described hereinbelow.

Figure 3:
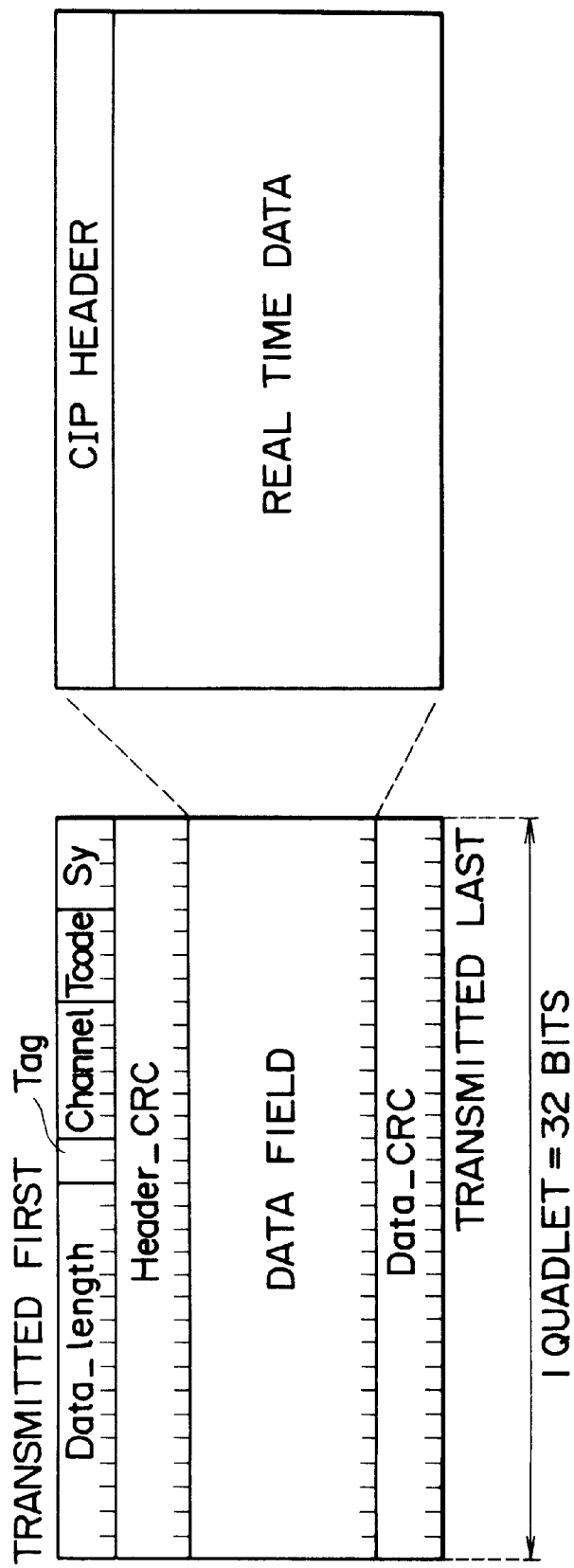
FIGS. 3A and 3B are diagrams to which reference will be made in explaining an isochronous communication packet.

A structure of a packet which may be utilized in isochronous communication is illustrated in FIG. 3A. As shown therein, such packet may include a packet header, a header CRC, a data field, and data CRC. The packet header may include data_length which represents the data length, Tag which represents the type of data format transmitted in the respective packet, Channel which represents a channel number of the respective packet (which may be from 0 to 63), Tcode which represents a processing code, and Sy which represents a synchronizing code specified for a respective application. The header_CRC is an error detection code of the packet header. The data field may include CIP header and real time data, as shown in FIG. 3B. The real time data is the data to be transmitted. The data_CRC is an error detection code of the data field.

Figure 4:
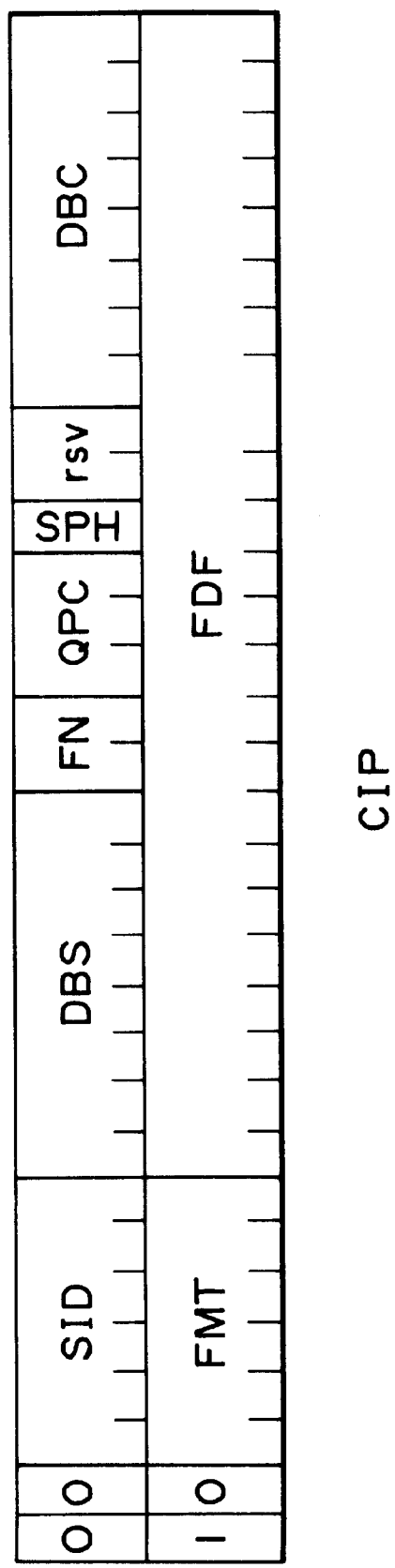
FIG. 4 is a diagram to which reference will be made in explaining a command format of a CIP header.

A format of the CIP header is illustrated in FIG. 4. As shown therein, the CIP header may include a transmission node number SID, a packet unit DBS, a data division number of the packet FN, a quadlet number added to make the data length a prescribed fixed length when dividing QPC (1 quadlet may be 4 bytes), a flag of a header of a source packet SPH, a counter for detecting a lacuna of a packet DBC, a signal format FMT, and a format dependent field FDF. The rsv is a spare region.

Figure 5:
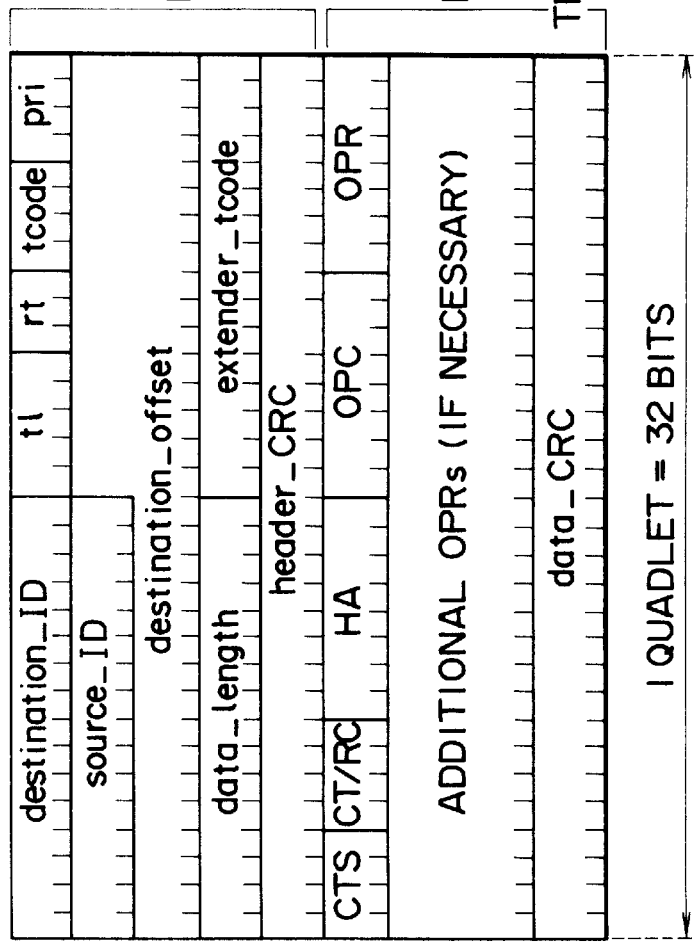
FIG. 5 is a diagram to which reference will be made in explaining a command and response packet in asynchronous communication.

A structure of a packet which may be utilized in asynchronous communication involving a command and a response is illustrated in FIG. 5. As shown therein, such packet may include a packet header and a data block. The packet header may have a destination_ID for identifying a destination, a transaction label (tl) for indicating a transaction label, a retry code (rt) for indicating a retry regeneration, a tcode for indicating a transaction code, a priority (pri), a source_ID for indicating a destination, a destination_offset for indicating the lower order (or 48 bits) of an address of a destination, a data_length for indicating the data length, an extended_tcode for indicating other processing codes, and a header_CRC for indicating an error detection code for the header. The data block may have CTS, CT/RC, HA, OPC, OPR, and data-CRC which is an error detection code for the data. The CTS, CT/RC, HA, OPC, and OPR will be described below with reference to FIGS. 6A and 6B.

As shown in FIG. 6A, for transferring a command, 0 is provided in CTS, a code for indicating the type of request is provided in CT/RC, a destination ID in the apparatus is provided in HA, the command to be transferred is provided in OPC, and the associated parameters are provided in OPR. As shown in FIG. 6B, for transferring a response, 0 is provided in CTS, a code for indicating the type of response is provided in CT/RC, an addresser ID in the apparatus is provided in HA, a code for indicating the processed command is provided in OPC, and the associated parameters are provided in OPR.

Figure 7:
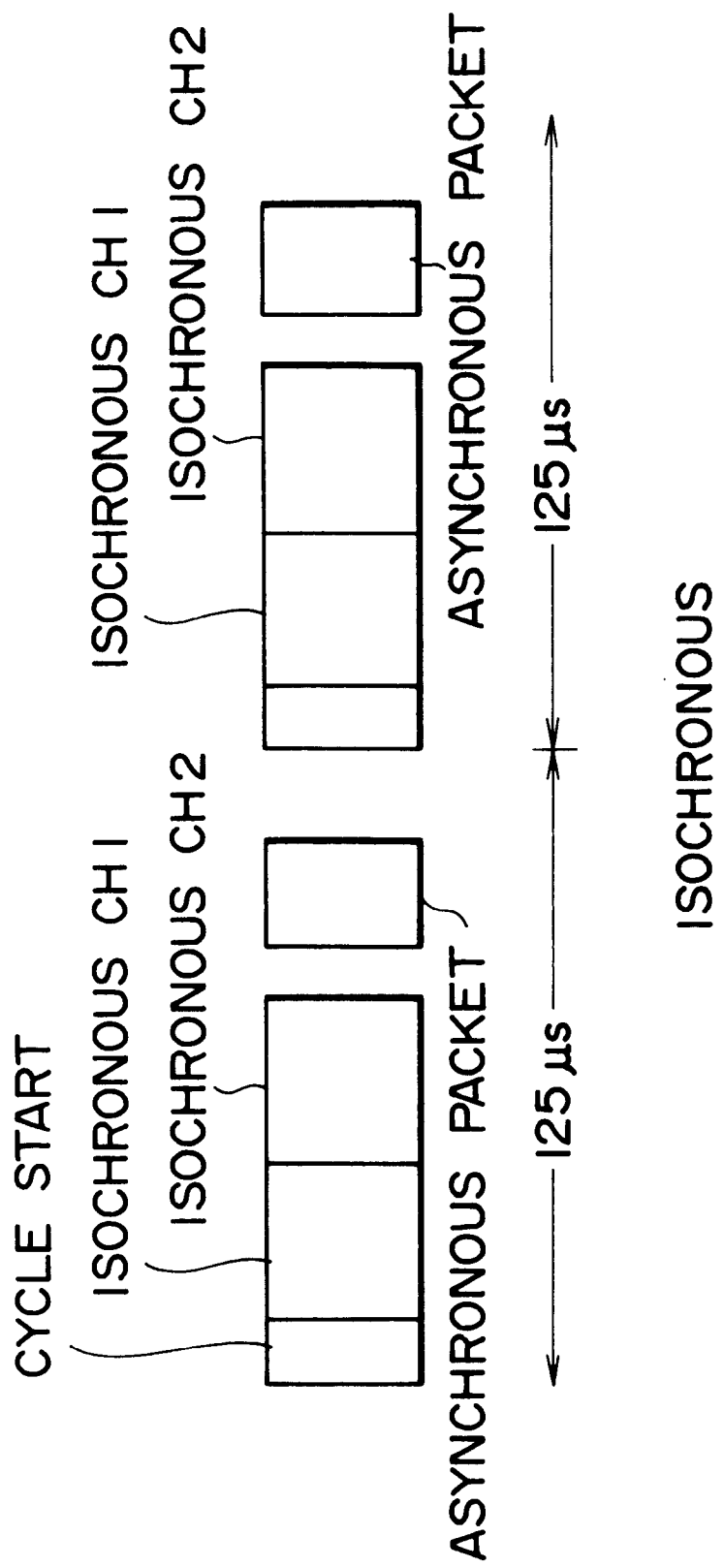
FIG. 7 is a diagram to which reference will be made in explaining isochronous communication.

As shown in FIG. 7, in isochronous communication, one of the respective AV apparatuses connected to the bus 64 may transmit a cycle start packet at an initial or first timing portion of a cycle having a predetermined period, such as 125 μsec. A predetermined time amount or zone may be allocated to the respective AV apparatuses for performing isochronous communication. As a result, each AV apparatus may transmit data with a prescribed channel number at the allocated timing. Thus, data may be transmitted within a certain time interval(s).

Returning to FIG. 2, the transmitter receiver section 91 of the presentation device 63-1 may perform isochronous communication and asynchronous communication according to an IEEE 1394 standard. That is, the 1394 transmitter receiver section 91 may receive data transmitted from the DVD player 61 by way of isochronous communication and may supply such data to a demultiplexing (demux) section 92. Such transmitted data may include presentation data (such as audio, video, and/or sub-picture data) and navigation data (such as navigation pack, VMGI, and/or VTSI). Further, the 1394 transmitter receiver section 91 may receive data transmitted from the DVD player 61 by way of asynchronous communication and supply such data to the navigation manager 95. Such transmitted data may include other navigation data. Additionally, the 1394 transmitter receiver section 91 may transmit a signal corresponding to a user operation generated in the user interface sub-controller section 97 to the 1394 transmitter receiver section 75 of the DVD player 61 by way of asynchronous communication.

Thus, the 1394 transmitter receiver section 91 may receive presentation data and a portion of navigation data by way of isochronous communication with the transmitter receiver section 75 of the DVD player 61. As a result of such isochronous transmission, the presentation device 63-1 may process the presentation data with the portion of navigation data in real time or without substantial time delays. The remaining portion of the navigation data (which may not have to be processed in real time) may be transmitted asynchronously from the DVD player 61.

The demux section 92 may receive the presentation data and navigation data from the 1394 transmitter receiver section 91 and may judge or determine the type of pack based on the stream ID value written in the supplied data (pack) header. As a result of such determination, the demux section 92 may output the presentation data to the presentation engine 93 and the navigation data to the navigation manager 95.

The presentation engine 93 may have a structure similar to that of the presentation engine shown in FIG. 16. Such presentation engine 93 may decode or process the received presentation data in accordance with data control signals supplied from the navigation manager 95 so as to obtain digital video and audio signals. These digital video and audio signals may be supplied to a digital-to analog (D/A) converter 94, whereupon such signals may be converted to analog video and audio signals and supplied to a designated device.

The navigation manager 95 may store data (such as a system parameter) supplied from the DVD player 61 through the 1394 transmitter receiver section 91 in a prescribed built-in register. Further, the navigation manager 95 may process the navigation data supplied from the demux section 92, and may output a signal corresponding to such processing to the presentation engine 93. Such output signal from the navigation manager 95 may, for example, pertain to highlight position information and color information for highlighting a selected portion of a menu, and color pallet information of the sub-picture.

An operation of the DVD player 61 and the presentation device 63-1 will now be described.

In the DVD player 61, presentation data and navigation data are read from the disc 101 by the disc drive 71 of the DVD 61. The read presentation data are supplied to the presentation engine 12 and the variable rate controller 72, and the read navigation data are supplied to the navigation manager 11A and the variable rate controller section 72. The presentation data (audio pack, video pack, and sub-picture pack) and navigation data (navigation pack, VMGI, VTSI) received by the variable rate controller section 72 are outputted to the 1394 transmitter receiver section 75 with a timing such that the presentation device 63-1 may decode the data immediately upon receipt thereof. Information (such as information specifying the language of the speech)

may be supplied from the navigation manager 11A to the presentation engine 12. Additionally, the transmitter section 121 of the navigation manager 11A may output a system parameter utilized in the processing performed by the navigation manager 95 of the presentation device 63-1 to the 1394 transmitter receiver section 75. The data supplied from the variable rate controller section 72 to the 1394 transmitter receiver section 75 are transmitted therefrom to the presentation device 63-1 in an isochronous manner. Further, the data supplied from the navigation manager 11A to the 1394 transmitter receiver section 75 are transmitted therefrom to the presentation device 63-1 in an asynchronous manner.

In the presentation device 63-1, the 1394 transmitter receiver section 91 receives the data transmitted from the 1394 transmitter receiver section 75 of the DVD player 61. The isochronously transmitted data are supplied to the demux section 92, and the asynchronously transmitted data are supplied to the navigation manager 95. The demux section 92 checks or determines the value of the stream ID and sub-stream ID of the data, and judges the data type (pack). If the pack is presentation data (any one of audio pack, video pack, and sub-picture pack), the demux section 92 outputs the respective pack to the presentation engine 93. If, on the other hand, the pack is navigation data (any one of navigation pack, VMGI, and VTSI), the demux section 92 outputs the respective pack to the navigation manager 95. The pack of the transmitted navigation data is processed by the navigation manager 95 and a signal corresponding thereto is supplied to the presentation engine 93. The presentation engine 93 decodes the presentation data supplied from the demux section 92 according to the signal supplied from the navigation manager 95, and outputs the generated digital video and audio signals to the D/A converter 94 which, in turn, converts such digital signals to analog signals and outputs the obtained analog signals.

Figure 8:
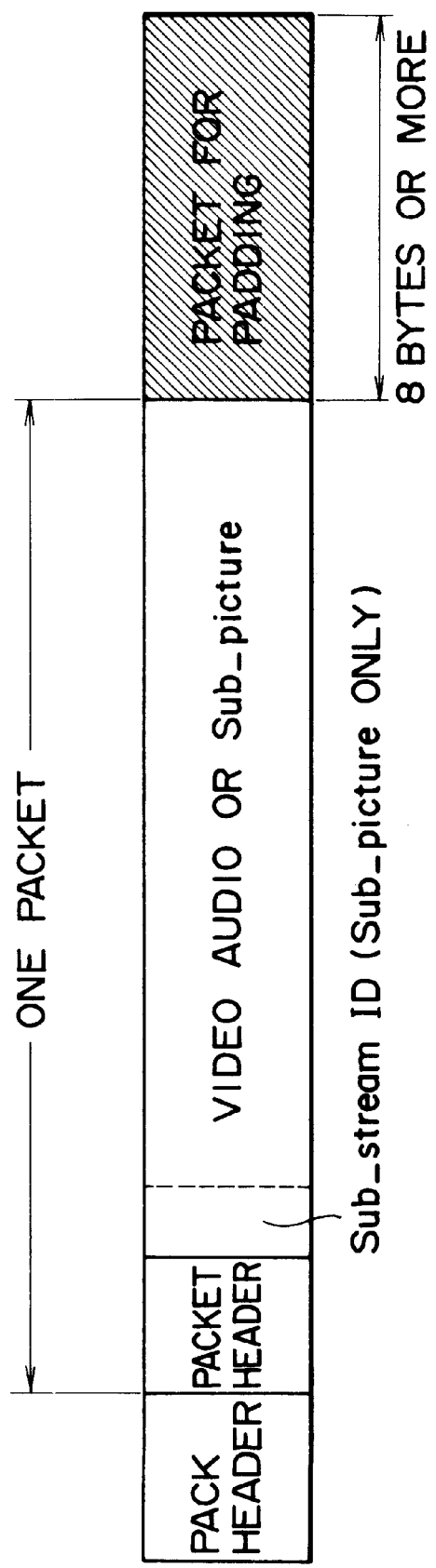
FIG. 8 is a diagram to which reference will be made in explaining a pack format of presentation data.

The presentation data may include a number of respective packs. FIG. 8 illustrates a pack format of presentation data. As shown therein, such format may include a pack header having 14 bytes located at the head of the pack, a packet header, a region for one of video information, audio information, and sub-picture information (compressed information), and padding information. The padding information may be used for matching the length of a pack to a prescribed fixed length and may not be used for the transmission of information. A stream ID may be written at a prescribed position (region) of the packet header.

Figure 9:
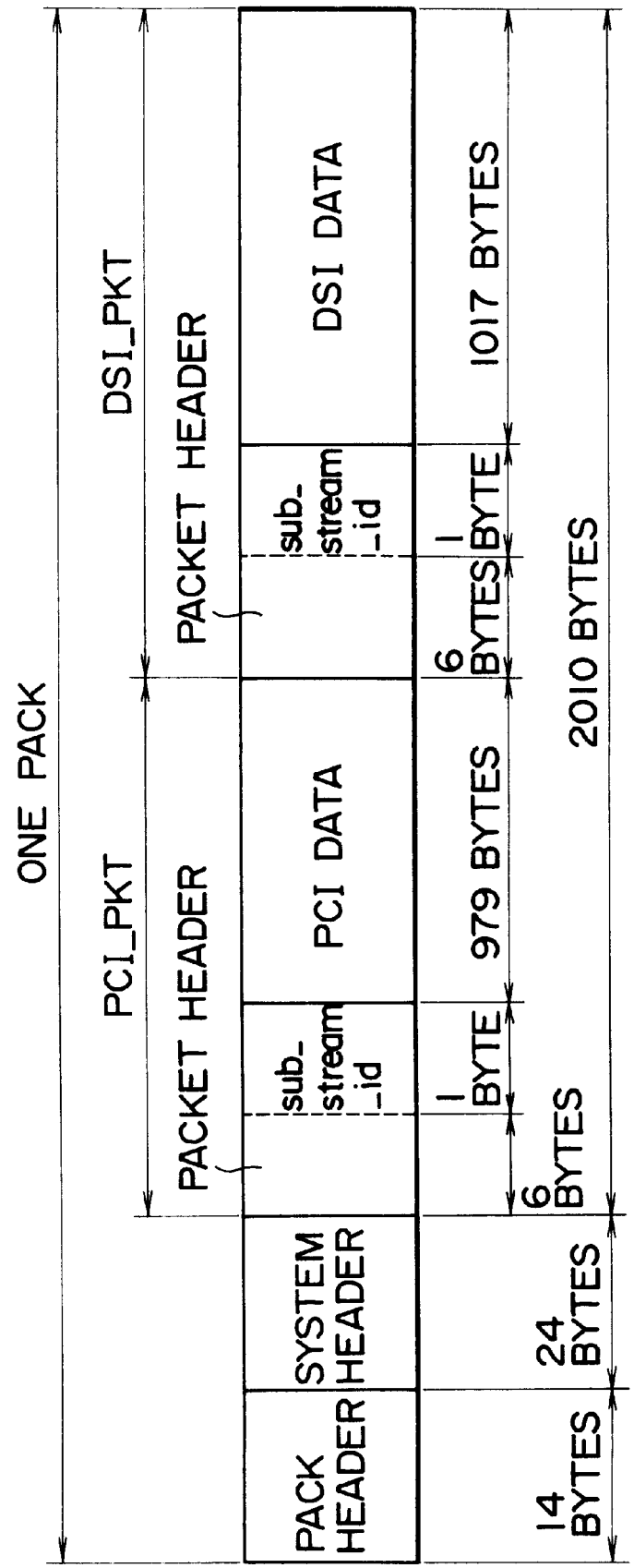
FIG. 9 is a diagram to which reference will be made in explaining a format of a navigation pack.

FIG. 9 illustrates a format of a navigation pack. As shown therein, such format may include a pack header having 14 bytes located at the head of a pack, a system header having 4 bytes, a presentation control information packet (PCI_PKT), and a data search information packet (DSI_PKT). The PCI packet may include a packet header having 6 bytes located at the head thereof, a sub-stream ID region having 1 byte, and PCI data having 979 bytes which may include highlight information. The DSI packet may include a packet header having 6 bytes located at the head thereof, a sub-stream ID region having 1 byte, and DSI data having 1,017 bytes which may indicate an offset value(s) of the data. A stream ID may be written at a prescribed position (region) of the system header.

As described above, a navigation pack may include two packets.

Further, an arrangement similar to that of the above-described navigation pack may be used for VMGI and/or VTSI.

FIG. 10 illustrates a relationship between stream ID values and pack types. The stream ID may be included in a packet header for a pack of presentation data, and the steam ID may be included in a system header for a pack of navigation data. However, in both situations, such stream IDs may be written at the same relative position (that is, each such ID may be written at a position which is located the same number of bits from the head of a pack). As shown in FIG. 10, if the stream ID is 110x0n1n2n3b (where b represents a binary number, x represents any one of 0 and 1, and ni is 0 or 1), the pack is an audio pack and, in particular, may be the (n1n2n3b)-th pack of a MPEG audio stream. If the steam ID is 11100000b, the pack is a video stream pack or a video pack. If the stream ID is 10111101b, the pack is a presentation data pack specified by the sub-stream ID. If the stream ID is 10111111b, the pack is a navigation data pack specified by the sub-stream ID.

FIG. 11 illustrates a relationship between sub-stream ID values of the presentation data pack and pack types. As shown therein, if the sub-stream ID is 001n1n2n3n4n5b (where ni is o or 1), the pack is a sub-picture pack and, in particular, may be the (n1n2n3n4n5b)-th pack of a sub-picture stream. If the sub-stream ID is 10000n1n2n3b, the pack is an audio pack such as the (n1n2n3b)-th pack of a Dolby-AC3 audio stream. If the sub-stream ID is 10001n1n2n3b, the pack is an audio pack such as the (n1n2n3b)-th pack of a DTS audio stream. If the sub-stream ID is 10010n1n2n3b, the pack is an audio pack such as the (n1n2n3b)-th pack of a SDDS audio stream. If the sub-stream ID is 10100n1n2n3b, the pack is an audio pack such as the (n1n2n3b)-th pack of a liner PCM audio stream.

FIG. 12 illustrates a relationship between the sub-stream ID values of the navigation data and packet types. If the sub-stream ID of the navigation data is 00000000b, the packet is a PCI packet and the pack having such respective packet is a navigation pack. If the sub-stream ID of the navigation data packet is 00000001b, the packet is a DSI packet and the pack having such respective packet is a navigation pack.

In a similar manner, predetermined sub-stream ID values may be allocated and utilized for packets (or packs) of VMGI and VTSI. Accordingly, if the value of the sub-stream ID is one of such predetermined values, the packet (or pack) is the corresponding one of VMGI or VTSI.

Accordingly, by checking the stream ID and/or the sub-stream ID, the type of data may be determined.

Thus, as previously described, in the DVD player 61 and presentation device 63-1 of FIG. 2, the DVD player 61 may transmit presentation data and a portion. of navigation data obtained from a disc 101 to the presentation device 63-1 in an isochronous communication manner so as to enable the presentation device 63-1 to process or decode the presentation data in accordance with the transmitted portion of the navigation data without substantial time delays (or in real time). The remaining portion of the navigation data (which is not utilized in such real time processing) may be transmitted from the DVD player 61 to the presentation device 63-1 in an asynchronous communication manner. Such arrangement of isochronous and asynchronous communication enables processing to be performed by the respective presentation device so as to reduce the amount of processing which may otherwise have to be performed by the DVD player.

Figure 13:
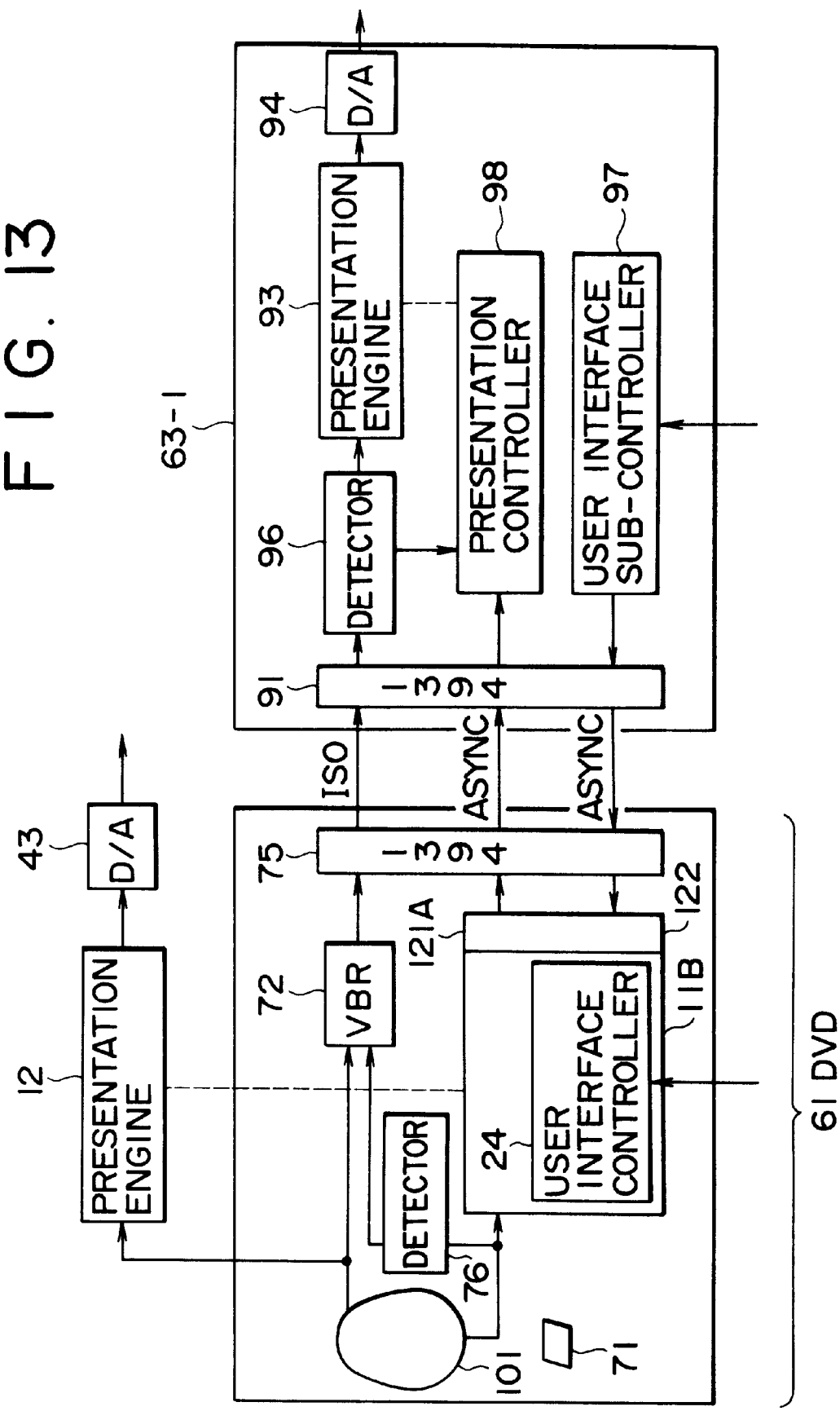
FIG. 13 is a diagram of a DVD player and a presentation device of the system of FIG. 1 in accordance with another embodiment of the present invention.
Figure 14:
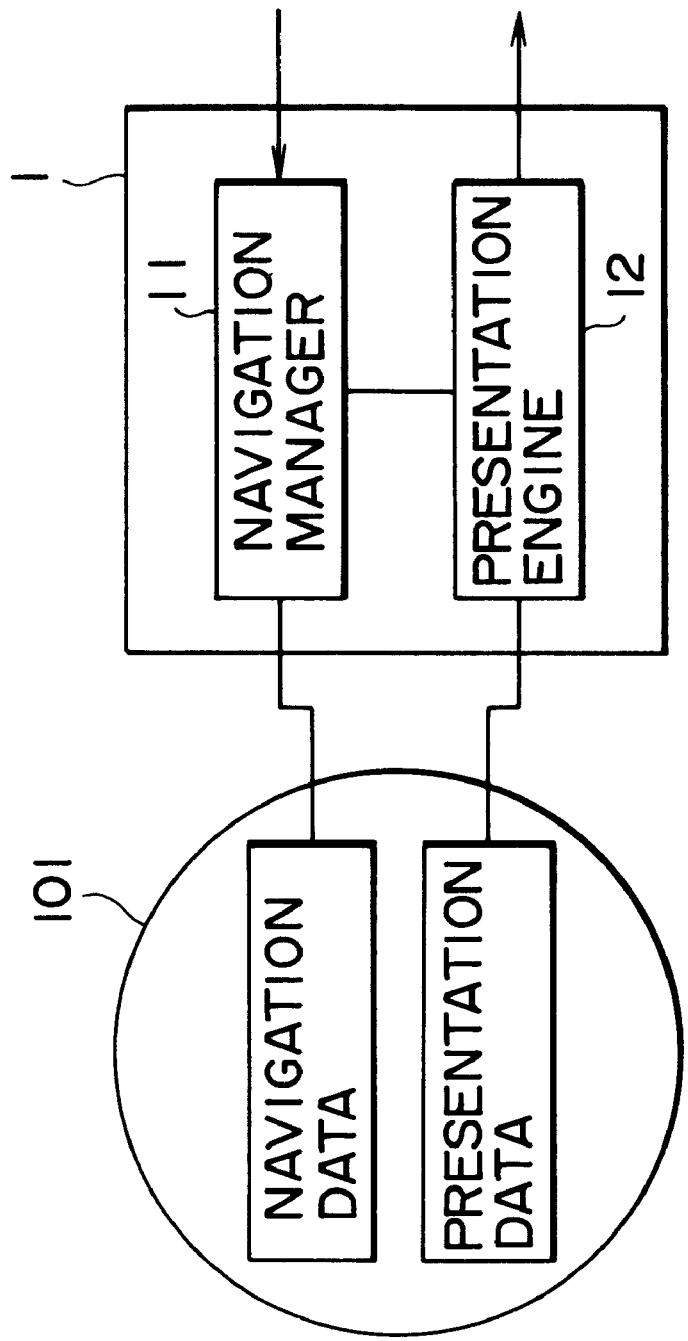
FIG. 14 is a diagram of a DVD player and disc usable with the DVD player.

Another embodiment of a DVD player 61' and a presentation device 63-1' is illustrated in FIG. 13. Although not shown in FIG. 13, the presentation devices 63-2 and 63-3 may be similarly coupled to the DVD player 61' and may have structures similar to that of the presentation device 63-1'. Further, the DVD player 61' and the presentation device 63-1' of FIG. 13 have elements which are similar to and are arranged in a similar manner to those of FIG. 2. Such similar elements may operate or perform in a manner similar to that previously described with reference to FIG. 2. Accordingly, such similar elements will either not be described or only briefly described below with reference to FIG. 13.

In the DVD player 61' of FIG. 13, the presentation data read from the disc 101 by the disc drive 71 may be supplied to the presentation engine 12 and the variable rate controller section 72, and the navigation data read from the disc 101 by the disc drive 71 may be supplied to a navigation manager 11B and a navigation pack detector section 76. The navigation manager 11B may have a transmitter section 121A for transmitting only the data utilized for processing in a presentation controller section 98 of the presentation device 63-1', and may have a receiver section 122 for receiving a command signal corresponding to a user operation supplied from the presentation device 63-1' and for converting such command signal to a format which corresponds to the processing of the navigation manager 11B. Additionally, the navigation manager 11B may also include other elements which may be similar to those of the navigation manager 11 shown in FIG. 15. The navigation pack detector section 76 may check the supplied stream ID and sub-stream ID of the navigation data and, in accordance with such checking, output only the navigation pack to the variable rate controller section 72. The other elements of the DVD player 61' may be similar to those of the DVD player 61 of FIG. 2 and, as such, will not be further described herein.

In the presentation device 63-1' of FIG. 13, a navigation pack detector section 96 may check the stream ID and sub-stream ID of the data supplied from the 1394 transmitter receiver section 91, output a pack of presentation data to the presentation engine 93, and output a navigation pack to the presentation controller section 98. The presentation controller section 98 may process the navigation pack received from the navigation pack detector section 96 and data received through the 1394 transmitter receiver section 91 so as to generate a control signal which may be supplied to the presentation engine 93. The other elements of the presentation device 63-1' may be similar to those of the presentation device 63-1 of FIG. 2 and, as such, will not be further described herein.

An operation of the DVD player 61' and presentation device 63-1' of FIG. 13 will now be described.

In the DVD player 61', presentation data and navigation data may be read from the disc 101 by the disc drive 71. The read presentation data may be supplied to the presentation engine 12 and the variable rate controller section 72 and the read navigation data may be supplied to the navigation manager 11B and the navigation pack detector section 76. The navigation pack detector section 76 outputs only the navigation pack of the navigation data to the variable rate controller section 72. The variable rate controller section 72 supplies the received data (which may be audio pack, video pack, sub-picture pack, and navigation pack) to the 1394 transmitter receiver section 75 with a timing such that the presentation device 63-1' may decode the data immediately upon receipt thereof. Further, the transmitter section 121A of the navigation manager 11B may supply to the 1394 transmitter receiver section 75 only the data utilized for processing in the presentation controller section 98 of the presentation device 63-1'. The 1394 transmitter receiver section 75 outputs the data supplied from the variable rate controller section 72 to the presentation device 63-1' in an isochronous communication manner, and outputs the data supplied from the navigation manager 11B to the presentation device 63-1' in an asynchronous communication manner.

In the presentation device 63-1', the 1394 transmitter receiver section 91 receives the data transmitted from the DVD player 61'. The 1394 transmitter receiver section 91 supplies the isochronously transmitted data to the navigation pack detector section 96 and supplies the asynchronously transmitted data to the presentation controller section 98. The navigation pack detector section 96 checks the value of the stream ID and sub-stream ID and judges the data type (pack). If the pack is presentation data (any one of audio pack, video pack, and sub-picture pack), the pack is supplied to the presentation engine 93. On the other hand, if the pack is a navigation pack, the pack is supplied to the presentation controller section 98. The presentation controller section 98 processes the navigation pack received from the navigation pack detector section 96 and may also process the data received from the 1394 transmitter receiver section 91 to generate a control signal therefrom which is supplied to the presentation engine 93. The presentation engine 93 decodes the presentation data received from the navigation pack detector section 96 in accordance with the control signal from the presentation controller section 98 so as to generate digital video and audio signals which are converted to analog signals by the D/A converter 94 and outputted therefrom.

Thus, as previously described, in the DVD player 61' and presentation device 63-1' of FIG. 13, the DVD player 61' may transmit presentation data and a navigation pack(s) obtained from a disc 101 to the presentation device 63-1' in an isochronous communication manner so as to enable the presentation device 63-1' to process or decode the presentation data in accordance with the transmitted portion of the navigation data without substantial time delays (or in real time). The DVD player 61' may transmit the remaining control or navigation data (which may include VTSI and VMGI) by way of asynchronous communication. The presentation device 63-1' may decode or process the presentation data in accordance with the navigation pack and/or control data.

The isochronous and asynchronous communication arrangement utilized in the embodiment of FIG. 13, as in the embodiment of FIG. 2, may enable processing to be performed by the respective presentation device so as to reduce the amount of processing which may otherwise have to be performed by the DVD player. Further, in the embodiment of FIG. 13, since only data from the navigation data (such as the navigation pack) utilized for real time processing in the presentation device 63-1' is isochronously transmitted (and the remaining data or that not utilized in real time processing may be asynchronously transmitted), transmission efficiency may be improved as compared to that of the embodiment of FIG. 2.

Although in describing the present invention, the navigation manager 11A of the DVD player 61 was described as performing processing corresponding to a user operation from the presentation device 63-1, the present invention is not so limited. For example, the navigation manager 95 (FIG. 2) or the presentation controller section 98 (FIG. 13) of the presentation device 63-1 or 63-1' may perform such processing.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An apparatus adaptable to be coupled to a number of presentation devices, said apparatus comprising:

means for producing audio data, video data, and navigation data; and an interface for transmitting said audio data, said video data, and a portion of said navigation data including presentation control information (PCI) data and data search information (DSI) data in an isochronous manner to one of said presentation devices and for transmitting another portion of said navigation data including a system parameter in an asynchronous manner to the respective one of said presentation devices.

2. An apparatus according to claim 1, wherein said interface conforms to a 1394 IEEE standard.

3. An apparatus according to claim 1, wherein said apparatus is a digital versatile disc (DVD) apparatus.

4. A presentation apparatus adapted to receive audio data, video data, and navigation data, said apparatus comprising:

an interface for receiving said audio data, said video data, and a portion of said navigation data including presentation control information (PCI) data and data search information (DSI) data in an isochronous manner and for receiving another portion of said navigation data including a system parameter in an asynchronous manner;

first processing means for processing said audio data, said video data, and said portion of said navigation data received in said first manner; and second processing means for processing said other portion of said navigation data received in said second manner.

5. A presentation apparatus according to claim 4, wherein said interface conforms to a 1394 IEEE standard.

6. An audio/video system comprising:

an electric apparatus having means for producing audio data, video data, and navigation data; and a first interface for transmitting said audio data, said video data, and a portion of said navigation data including presentation control information (PCI) data and data search information (DSI) data in an isochronous manner and for transmitting another portion of said navigation data including a system parameter in an asynchronous manner; and a presentation apparatus having a second interface for receiving said audio data, said video data, and a portion of said navigation data in said isochronous manner from said electric apparatus and for receiving another portion of said navigation data in said asynchronous manner from said electric apparatus.

7. An audio/video system according to claim 6, wherein said presentation apparatus includes first processing means for processing said audio data, said video data, and said portion of said navigation data received in said isochronous manner and second processing means for processing said other portion of said navigation data received in said asynchronous manner.

8. An audio/video system according to claim 6, wherein said first interface and said second interface conform to a 1394 IEEE standard.

9. An audio/video system according to claim 6, wherein said electric apparatus is a digital versatile disc (DVD) apparatus.

10. A method for transmitting and receiving data between a plurality of pieces of audio/video equipment, said method comprising the steps of:

producing audio data, video data, and navigation data in an electric apparatus;

transmitting said audio data, said video data, and a portion of said navigation data including presentation control information (PCI) data and data search information (DSI) data in an isochronous manner by way of a first interface of said electric apparatus and transmitting another portion of said navigation data including a system parameter in an asynchronous manner by way of said first interface of said electric apparatus;

receiving said audio data, said video data, and said portion of said navigation data transmitted from said electric apparatus at a second interface of a presentation apparatus in said isochronous manner and receiving said other portion of said navigation data transmitted from said electric apparatus at said second interface of said presentation apparatus in said asynchronous manner.

11. A method for transmitting and receiving data according to claim 10, further comprising the steps of processing said audio data, said video data, and said portion of said navigation data received in said isochronous manner by use of a first processing device of said presentation apparatus and processing said other portion of said navigation data received in said asynchronous manner by use of a second processing device of said presentation apparatus.

12. A method for transmitting and receiving data according to claim 10, wherein said first interface and said second interface conform to a 1394 IEEE standard.

13. A method for transmitting and receiving data according to claim 10, wherein said electric apparatus is a digital versatile disc (DVD) apparatus.

* * * * *